3,796,758
STABILIZATION OF CHLORAL

Paul H. Goble, Painesville, Ohio, assignor to Diamond Shamrock Corporation, Cleveland, Ohio
No Drawing. Filed June 21, 1972, Ser. No. 264,895
Int. Cl. C07c 47/24
U.S. Cl. 260—601 H         4 Claims

ABSTRACT OF THE DISCLOSURE

The oxidation, decomposition and polymerization of chloral during prolonged storage are essentially inhibited by incorporating therein from about 0.05% to 0.5%, by weight, of a $C_{12-18}$ alkyl ester of thiodipropionic acid.

BACKGROUND OF THE INVENTION

This invention relates to the stabilization of chloral, whereby its susceptibility to polymerization, decomposition and/or attack by oxidative agents is greatly inhibited during prolonged storage prior to use.

Chloral (trichloroacetaldehyde, $CCl_3CHO$) which normally is a liquid having a freezing point about $-57°$ C. and a boiling point of about $97°$ C., is important as an intermediate in the synthesis of a wide variety of organic chemicals and as a pharmaceutical agent. It may also be polymerized to flame-retardant polymers.

Chloral can be manufactured most economically by semi-continuous, long production processes which minimize start-up and shutdown costs. Upon standing for any length of time prior to use, especially when in contact with, for example, light, gases, air, water, acids, transition metals and other reaction-catalytic materials, chloral tends to polymerize prematurely, to decompose and/or be oxidized to undesirable products. Thus, it is extremely difficult to react storage-aged chloral and obtain optimum results.

In order to be able to manufacture chloral most economically on a semi-continuous basis, chloral of improved stability even during prolonged storage is of course desirable. Accordingly, efforts have long been made heretofore in the art to improve chloral stability by incorporating various additives therein after preparation. For example, the addition of various aliphatic amines and certain non-aromatic ethers to chloral has been described by Williams, Thomas and Haines in their U.S. Pat. Nos. 3,504,952 and 3,504,953. The addition of a 4–7 membered lactam, e.g., caprolactam, to stabilize chloral is described by Berkowitz in U.S. Pat. No. 3,535,384. However, these prior art additives have not been completely satisfactory.

I have now found that by incorporating into chloral a minor quantity of a $C_{12-18}$ alkyl ester of thiodipropionic acid, any significant polymerization, oxidation and other types of degradation of the chloral can simultaneously be prevented during storage periods of six months or even longer.

SUMMARY OF THE INVENTION

Accordingly, the present invention comprises stabilizing chloral against noticeable polymerization, oxidation and decomposition during prolonged storage by incorporating therein from 0.05 to 0.50 percent, by weight of chloral, of any one of a group of alkyl esters of thiodipropionic acid which have the formula:

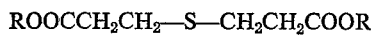

wherein R is an alkyl radical of 12–18 carbon atoms. Representative suitable esters include dilauryl thiodipropionate, di(tridecyl) thiodipropionate, dimyristyl thiodipropionate, dicetyl thiodipropionate, and distearyl thiodipropionate. These compounds are known materials, their preparation being described by Gresham et al. in U.S. Pat. 2,468,725. Heretofore in the art, they have found particular use as antioxidants for fatty materials and for polymers such as polyolefins as described, for example, in U.S. Pat. Nos. 3,157,517; 3,466,323; 3,282,890; and 3,344,113, among others.

DESCRIPTION OF THE PREFERRED EMBODIMENTS

Chloral is known to be prepared from either chlorinated or nonchlorinated starting materials. A particularly feasible process and one which is normally employed commercially comprises chlorinating ethanol through several intermediate products to chloral ethylalcoholate which, in turn, is then decomposed by sulfuric acid. The desired chloral product is recovered from this reaction mixture by distillation. This process is described in the Kirk-Othmer Encyclopedia of Chemical Technology, Vol. 3, Interscience Publishers (1949), pp. 660–663. Alternatively, acetaldehyde may be chlorinated, with the product being isolated typically as a chloral-chloral hydrate mixture. The hydrate, in turn, may be easily dissociated into chloral and water with moderate heating in the presence of a dehydrating agent such as fuming sulfuric acid. The chloral mass is then decanted from the sulfuric acid layer and distilled to obtain a chloral product which is approximately 99% pure. The product will contain varying minute percentages of water depending upon the quantity of hydrate present in the chloral mixture as well as the quantity of fuming sulfuric acid used therewith in the dehydration step. It is to be understood that the preparation of chloral by the foregoing or any other methods does not constitute in itself a part of this invention.

Several different reactions, occurring successively or in combination, are believed to be responsible for the reduction of chloral quality with aging. For example, low molecular weight, insoluble polymers as "metachloral" or "parachloral" may easily form because of chloral's strong tendency to polymerize, even auto-catalytically. Oxidation of the compound to trichloroacetic acid, HCl, CO, $CO_2$ and/or phosgene can gradually occur. Likewise, decomposition of chloral to, e.g., chloroform may oftentimes be effected. By practice of the present invention, the foregoing reactions contributing to chloral degradation during prolonged storage are significantly retarded.

In general, any of the long chain alkyl thiodipropionates conforming to the foregoing structure may be suitably employed to stabilize chloral in accordance with this invention. Of these, distearyl thiodipropionate (STDP) and dilauryl thiodipropionate (LTDP) have been found most effective at present and are preferred. Further, LTDP is the most preferred stabilizing additive since it is most soluble in chloral and will provide, when used in minimal quantities, the desired chloral stabilization.

Depending upon the chloral assay and the overall storage conditions, i.e., storage temperature, time, etc., use of the thiodipropionate ester in amounts ranging generally from about 0.05 to about 0.5%, by weight of chloral, will provide the desired stabilizing effects, with amounts of thiodipropionate ranging from 0.1 to 0.4%, by weight of chloral being adequate and preferred.

As pointed out previously herein, use of the alkyl thiodipropionate stabilizers of this invention is found to provide substantial protection against premature chloral polymerization during storage as well as inhibiting its significant oxidation, decomposition and/or color development. This overall stabilizing efficiency is indeed surprising since many compounds known and used heretofore in the art as antioxidants and the like when tested in accordance with my evaluations generally were found to acelerate color development in chloral with even minimal storage.

To determine the stabilizing effectiveness of the alkyl thiodipropionate esters, a series of freshly distilled chloral samples was prepared, each containing a prescribed quantity of the particular ester additive being tested. A series of chloral samples was similarly prepared with no additive incorporated as controls. These samples were then stored at ambient temperature for a time period of up to 6 months. At periodic intervals during the storage period, a stabilized sample and a control were each analyzed by procedures described hereinafter for weight percent of chloroform, total acid (as HCl) and nonvolatile matter (polymer) to indicate comparative incremental degradation of the chloral during storage.

The following examples are given in order that those skilled in the art may more completely understand the invention and preferred methods for carrying it out, but are not intended to limit the invention in any way. In these examples, where proportions of ingredients may be given in parts, such proportions are by weight.

Example 1

In this example, there is employed freshly distilled liquid chloral containing, by weight, 0.33% chloroform, 0.13% total acid (as HCl), 10 mm. phosgene and 0.206% water. Samples are prepared in clear glass bottles, each incorporating, by weight, 0.2% lauryl thiodipropionate. Also prepared are chloral samples to which no additive is incorporated as controls. There is approximately a 60 ml. air space above the liquid in each bottle. The prepared samples are stored at room temperature with exposure to ambient fluorescent light for 8–16 hours per day.

At periodic intervals during storage, the samples are visually examined for color development and evidence of precipitation and both a stabilized and a control sample are analyzed as follows.

The total acid content (as HCl) is determined by pipetting an aliquot of the sample into distilled water, stirring, adding methyl red indicator and then titrating with 0.1 N NaOH.

Chloroform analysis is carried out at 50° C. by injecting a 2.0 microliter sample into a Fisher/Victoreen Series 4400 Gas Chromatograph, employing a 6' x ⅛" stainless steel column packed with (SE-30) impregnated ABS granules. The peak height measured is compared with that of a reference standard to obtain the weight percent of chloroform in the chloral sample. Phosgene analysis is conducted similarly. The peak height measured, however, is not referenced against any standard but is recorded for comparison purposes.

Polymer content of the samples is determined by distilling the sample at 60° C. under 10–15 mm. pressure for 1 hour. The weight percent nonvolatile matter remaining, i.e., polymer, is then calculated by weight difference. After 6 months storage, the analytical results are as follows:

TABLE 1

| Additive | Nonvolatiles, percent | Total acid, percent | Chloroform, percent | Phosgene (mm.) |
|---|---|---|---|---|
| None | 7.3 | 0.41 | 0.72 | 34 |
| LTDP | 1.57 | 0.31 | 0.53 | 32 |

As indicated, the LTDP ester noticeably inhibits polymerization and decomposition of the chloral while likewise inhibiting its oxidation, by comparison to the unstabilized material.

Example 2

In this example, freshly distilled chloral is employed which contains, by weight, 0.06% chloroform, 0.25% total acid, 2 mm. phosgene and 0.09% water. Stabilized samples containing 0.2%, by weight of the LTDP and unstabilized controls are prepared in clear glass bottles as previously described. Storage is carried out at room temperature, with visual observation and analyses of the samples being made periodically. Analysis of the samples after 6 months aging gives the following results:

TABLE 2

| Additive | Nonvolatiles, percent | Total acid, percent | Chloroform, percent | Phosgene (mm.) |
|---|---|---|---|---|
| None | 3.70 | 0.69 | 2.27 | 61 |
| LTDP | 2.8 | 0.53 | 0.08 | 39 |

The control sample is observed to contain a heavy white sediment while the stabilized sample has a very slight yellowish tint.

Example 3

Following the same general procedure as outlined in the previous examples, chloral samples are prepared with and without addition of 0.2%, by weight, of stearyl thiodipropionate (STDP). The freshly distilled chloral used contains 0.40% total acid, 0.09% chloroform, 10 mm. phosgene and 0.16% water. Analysis of the samples after 6 months storage yields the following results:

TABLE 3

| Additive | Nonvolatiles, percent | Total acid, percent | Chloroform, percent |
|---|---|---|---|
| None | 6.06 | 0.93 | 2.36 |
| STDP | 4.12 | 0.82 | 0.15 |

VPC analysis of the unstabilized sample indicates for phosgene, a peak height of 42 mm. after 2 months storage while that of the stabilized sample is only 43 mm. after 6 months storage. Further, the control sample is extremely hazy in appearance while the stabilized sample is clear, slightly off-white in color.

A higher concentration of STDP may be employed to inhibit chloral polymerization still further.

Example 4

Chloral hydrate (986 g.) is mixed with chloroform (300 g.) and carefully distilled through a 30-plate Oldershaw column topped with variable take-off head. Water is separated from the distillate and the chloroform layer is dried and recycled to the distillation system. After approximately 3000 ml. of the azeotrope has distilled, the chloroform remaining in the pot is removed by fractionationd and the chloral remaining is flash distilled. This product is found by analysis to contain, by weight, 0.12% chloroform, 0.08% total acid and 0.06% water.

Samples are prepared of the product containing 0.2% lauryl thiodipropionate, by weight, together with similar samples with no additive incorporated as controls. These are examined visually at prescribed intervals during storage at room temperature and are likewise analyzed. After 6 months storage, analysis of the samples gives the following results:

TABLE 4

| Additive | Nonvolatiles, percent | Total acid, percent | Chloroform, percent | Phosgene (mm.) |
|---|---|---|---|---|
| None | 2.65 | 0.48 | 1.8 | 48 |
| LTDP | 1.3 | 0.68 | 0.43 | 32 |

A white sediment is observed in the unstabilized sample, while the sample stabilized in accordance with the invention is clear and water white.

It is to be understood that although the invention has been described with specific reference to particular embodiments thereof, it is not to be so limited, since changes and alterations therein may be made which are within the full intended scope of this invention as defined by the appended claims.

What is claimed is:
1. A chloral composition having improved stability against significant polymerization, oxidation and decomposition during prolonged storage comprising chloral containing, by weight, from 0.05 to 0.5% of an ester of thiodipropionic acid of the formula

$$ROOCCH_2CH_2-S-CH_2CH_2COOR$$

wherein R is an alkyl radical of 12–18 carbon atoms.

2. The composition of claim 1 wherein the thiodipropionic acid ester is dilauryl thiodipropionate.

3. The composition of claim 1 wherein the thiodipropionic acid water is distearyl thiodipropionate.

4. The composition of claim 1 which contains by weight of the chloral from 0.1% to 0.2% of the thiodipropionic acid ester.

References Cited

UNITED STATES PATENTS 2,504,952  4/1950  Williams et al. ____ 260—601 H
3,535,384  10/1970  Berkowitz _____ 260—601 H

OTHER REFERENCES

Scott, G., "Chemical Communications" Chemical Society (London), vol. 24, pp. 1572–1574 (1968).

Lundberg, W. O., (Edt.) "Autoxidation and Antioxidants" vol. 2, Interscience, N.Y., pp. 503–504 (1962).

Akamatsu, S., et al., "Chemical Abstracts," vol. 70, Abstract 6988J (1969).

Clement, G. H., "Action of Antioxidants" Food Mfgr. Ingredient Survey, January 1966, pp. 10–11.

LEON ZITVER, Primary Examiner

D. B. SPRINGER, Assistant Examiner